United States Patent Office 2,815,311
Patented Dec. 3, 1957

2,815,311

STABLE SOLID DISINFECTANT COMPOSITIONS

John G. Ellis, Rensselaer, N. Y., and Vladimir Dvorkovitz, Kansas City, Mo., assignors to The Diversey Corporation, a corporation of Illinois No Drawing. Application January 25, 1957,
Serial No. 636,245

9 Claims. (Cl. 167—18)

This invention relates to stable, solid disinfectant compositions capable of providing in aqueous solution hypobromite ions or available bromine or a mixture of available chlorine and available bromine.

It has been discovered that aqueous solutions containing hypobromite ions or available bromine possess extraordinary disinfectant properties, particularly against micro-organisms (e. g., *M. pyogenes* var. *aureus*) which are difficult to control. However, solid compositions that produce hypobromite ions or available bromine in aqueous solutions, such as exemplified by alkali metal hypobromites, tend to be unstable; similarly, solid mixtures of hypobromites such as sodium hypobromite in combination with hypochlorites tend to be unstable.

We have discovered stable, solid compositions that contain a hypochlorite component in combination with a bromide and which provide hypobromite ions or available bromine in aqueous solution. These solid compositions contain (1) a hypochlorite component that is stable in the solid state and is either (a) anhydrous or (b) has water of hydration firmly bound thereto to the extent that the bromide compound will not readily pick up that water of hydration, and (2) a bromide compound that is either (a) anhydrous or (b) has water of hydration firmly bound thereto to the extent that the hypochlorite component will not readily pick up that water of hydration.

In our stable solid compositions, the hypochlorite component and bromide compound are each anhydrous with respect to the other in that neither ingredient is capable of yielding water of hydration to the other. The hypochlorite component and bromide do not readily interact by virtue of the ability of the hypochlorite component to maintain its original degree of hydration in the presence of the bromide compound. It is understood that by "degree of hydration" we also include those hypochlorite components which are anhydrous, in which case the "degree of hydration" is nil. Thus, the hypochlorite component must not readily pick up water from or lend water to the bromide compound, and vice versa; such solid compositions will be stable and the hypochlorite component therein will be capable of substantially maintaining its normal stability. For example, both the hypochlorite component and bromide may be either (a) anhydrous or (b) hydrated, or (c) the hypochlorite component may be hydrated while the bromide compound is anhydrous. In the event that both the hypochlorite component and bromide are hydrated, each of these ingredients must not readily pick up water of hydration from the other. On the other hand, if the bromide compound is anhydrous and the hypochlorite component is hydrated, the bromide compound must not readily pick up that water of hydration.

The term "hypochlorite component" herein refers to solid compounds or complexes that (1) are stable, (2) provide hypochlorite or available chlorine in aqueous solution, (3) are either (a) anhydrous or (b) have water of hydration firmly bound thereto to the extent that the bromide compound will not readily pick up that water of hydration, thus substantially maintaining the normal stability of said component, and (4) enable the bromide to provide hypobromite ions or available bromine in aqueous solution.

The term "bromide" or "bromide compound" herein refers to solid compounds that (1) are substantially neutral to alkaline, (2) provide bromide ions in aqueous solution, but provide hypobromite ions or available bromine in the presence of the hypochlorite component and water, and (3) are either (a) anhydrous or (b) have water of hydration firmly bound thereto to the extent that the hypochlorite component will not readily pick up water of hydration from the bromide compound, thus substantially maintaining the normal stability of the hypochlorite component.

The term "stable" herein refers to the ability of the solid hypochlorite component to retain a substantial portion of its originally available chlorine content, thus substantially maintaining its normal stability, in combination with the bromide compound in dry, closed containers. This requires, as a prerequisite, that the solid hypochlorite component per se be stable and be either anhydrous or, if hydrated, have its water of hydration firmly bound thereto. In order to be considered "stable," the hypochlorite component, in combination with the bromide, must retain at least 50% of its originally available chlorine content when stored in a dry, air-tight container (e. g., glass bottles) at 80° F. for six months.

The available chlorine in the hypochlorite component enables the bromide compound to provide hypobromite ions or available bromine in aqueous solution. One chemical equivalent weight of available chlorine will enable one equivalent weight of bromide ion to provide substantially one equivalent weight of available bromine. When the solid composition provides a greater molecular equivalent amount of available chlorine in solution than available bromine, such solutions will provide a mixture of available bromine in combination with available chlorine. Solutions of our solid compositions possess greater germicidal activity than if a molecular equivalent amount of available chlorine alone were present.

Our invention contemplates the use of stable, solid hypochlorite components that are essentially anhydrous. These components include compounds such as calcium hypochlorite (anhydrous), di- and tri-chloroisocyanuric acid, chloromelamine such as disclosed in U. S. Pat. No. 2,184,883, and the like.

In addition, the hypochlorite component may be a stable, solid complex or compound having water of hydration firmly bound thereto such as exemplified by chloramine T (i. e., sodium p-toluenesulfonchloramine having three moles of water of hydration), chloramine B (i. e., sodium benzenesulfonchloramine having two moles of water of hydration), calcium hypochlorite (i. e., $Ca(OCl)_2 \cdot 4H_2O$), a chlorinated trisodium phosphate containing ½–4% available chlorine produced by combining trisodium phosphate in its normal $Na_3PO_4 \cdot 12H_2O$ form and an alkali metal hypochlorite (e. g., sodium hypochlorite) in accordance with the procedures set forth in Mathias Patent No. 1,555,474 and Adler Patent No. 1,965,304, and the like.

When our solid composition contains an anhydrous hypochlorite component, anhydrous alkali metal bromides such as potassium bromide and sodium bromide may be used.

We have found that when alkali metal bromides such as potassium bromide, sodium bromide and sodium bromide dihydrate are admixed with a hypochlorite component having water of hydration firmly bound thereto, the bromide does not tend to pick up that water of hydration.

Alkaline earth metal bromides such as solid calcium bromide may also be used, but are generally restricted to uses wherein the hardness constituents and turbidity introduced into aqueous solutions by these bromides are not objectionable.

Table I shows some of the (a) anhydrous hypochlorite components and (b) hypochlorites having water of hydration firmly bound thereto that may be admixed with various bromides in accordance with our invention.

TABLE I

| (a) Essentially Anhydrous Hypochlorite Components | Bromides |
|---|---|
| Anhydrous calcium hypochlorite | KBr |
| Dichloroisocyanuric acid | |
| Trichloroisocyanuric acid | NaBr |
| Chloromelamine | |

| (b) Hypochlorite Components Having Water of Hydration Firmly Bound Thereto | Bromides |
|---|---|
| Chloramine B | KBr |
| Chloramine T | |
| Chlorinated trisodium phosphate | NaBr·2H$_2$O |
| Calcium hypochlorite (Ca(OCl)$_2$·4H$_2$O) | NaBr |

Normally, our solid composition possesses observable disinfectant properties in solution when said composition yields at least about 0.078% by weight available bromine (based on the weight of said solid composition) and at least about 0.5% by weight available chlorine (based on the weight of said solid composition). Our solid composition should not contain more bromide than that which would provide 225% by weight available bromine, based on the weight of available chlorine, in solution; otherwise unreacted bromide would remain as such in the disinfecting solution and would not contribute any beneficial germicidal activity thereto. The maximum percent by weight of available chlorine that may be present in our solid composition is determined by the maximum amount of available chlorine that can be yielded by the hypochlorite component when about 0.078% by weight available bromine (based on the weight of the solid composition) is yielded by the solid composition in solution. The solid disinfectant composition should yield, in solution, at least about 1% by weight, preferably about 5–20%, available bromine based on the weight of available chlorine. Obviously, if desired, the solid composition may contain sufficient bromide so as to provide in aqueous solution, on a weight basis, more bromide ion than available chlorine.

Table II illustrates the stability of our compositions by showing the results of storage tests on two examples of mixtures of alkali metal bromides and chlorinated trisodium phosphate. These tests were run by storing the described materials in 1-pound, screw-top glass jars at 80° F. for nine months. The available chlorine content is shown initially and periodically for nine months.

TABLE II

| Description of Material | Percent available chlorine after— | | | |
|---|---|---|---|---|
| | 0 Month | 1 Month | 3 Months | 9 Months |
| Chlorinated Trisodium Phosphate | 3.63 | 3.59 | 3.44 | 3.25 |
| Chlorinated Trisodium Phosphate plus 1.35% NaBr·2H$_2$O | 3.56 | 3.37 | 3.28 | 2.80 |
| Chlorinated Trisodium Phosphate plus 1.16% KBr | 3.56 | 3.42 | 3.29 | 3.03 |

Examples of suitable mixtures of chlorinated trisodium phosphate and sodium bromide dihydrate are as follows (all percentages in Examples 1–4 are based on the weight of the solid composition):

*Example 1*

6.86 gms. NaBr·2H$_2$O (6.42% of total)
100 gms. chlorinated trisodium phosphate (3.5% available Cl$_2$)
In solid mix:
    3.28% available chlorine
    3.44% NaOCl
In solution:
    0% available chlorine
    7.38% available Br$_2$
    5.49% NaOBr

*Example 2*

3.43 gms. NaBr·2H$_2$O (3.32% of total)
100 gms. chlorinated trisodium phosphate (3.5% available Cl$_2$)
In solid mix:
    3.42% available chlorine
    3.60% NaOCl
In solution:
    2.86% NaBr·2H$_2$O
    3.84% av. Br$_2$
    1.71% av. chlorine
    1.80% NaOCl

*Example 3*

1 gm. NaBr·2H$_2$O (.99% of total)
100 gms. chlorinated trisodium phosphate
In solid mix:
    3.47% available Cl$_2$
    3.65% NaOCl
In solution:
    2.96% available Cl$_2$
    1.14% av. Br$_2$
    3.11% NaOCl
    .85% NaOBr

*Example 4*

1.34 gms. NaBr·2H$_2$O (1.32% of total)
100 gms. chlorinated trisodium phosphate
In solid mix:
    3.46% available Cl$_2$
    3.64% NaOCl
In solution:
    1.52% av. Br$_2$
    2.78% av. Cl$_2$
    2.94% NaOCl
    1.14% NaOBr In the above examples, the sodium bromide dihydrate may be incorporated in its usual crystalline form, being mixed with crystals of chlorinated trisodium phosphate. In order to avoid separation in packaging, it is preferred that the crystals or particles be of substantially same order of size.

The following examples illustrate suitable mixtures which include, as the hypochlorite component, calcium hypochlorite, chloramine T, and chloromelamine. (All of the figures shown in these examples are based on percent by weight of the composition.)

*Example 5*

| | Percent |
|---|---|
| Calcium hypochlorite [1] | 99.5 |
| NaBr | .5 |

*Example 6*

| | |
|---|---|
| Calcium hypochlorite [1] | 80 |
| NaBr | 20 |

*Example 7*

| | |
|---|---|
| Calcium hypochlorite [1] | 50 |
| NaBr | 50 |

Example 8

| | |
|---|---|
| Calcium hypochlorite [1] | 10 |
| NaBr | 2 |
| Trisodium phosphate [1] | 88 |

Example 9

| | |
|---|---|
| Chloramine T | 99 |
| NaBr | 1 |

Example 10

| | |
|---|---|
| Chloramine T | 90 |
| NaBr | 10 |

Example 11

| | |
|---|---|
| Chloramine T | 50 |
| NaBr | 4 |
| Sodium carbonate [1] | 46 |

Example 12

| | |
|---|---|
| Chloromelamine [1] | 99 |
| NaBr | 1 |

Example 13

| | |
|---|---|
| Chloromelamine [1] | 80 |
| NaBr | 20 |

[1] Anhydrous.

Diluents such as cleaning agents and the like may, if desired, be included in our compositions as long as those diluents do not destroy the stability of our compositions, and enable the hypochlorite component to maintain its original degree of hydration. For example, the chlorinated trisodium phosphate-bromide mixture may be marketed with a considerable amount of other materials such as complex phosphates, silicates, and even coloring materials such as potassium permanganate.

Table III shows the results of tests on *M. pyogenes* var. *aureus* by the Weber and Black method (Am. J. Public Health, 38, 1405–1417). "TNTC" indicates that less than 99.9% of the organisms were destroyed. Where a figure is shown, it indicates over 99.9% destruction of the organism. The germicide was calcium hypochlorite, in concentrations which provide the parts per million of chlorine indicated. The data shown in Table IV were obtained with calcium hypochlorite plus 20% sodium bromide when the same test procedure was used.

TABLE III

| Available Chlorine, p. p. m. | 15 Sec. | 30 Sec. | 60 Sec. | 120 Sec. | 300 Sec. |
|---|---|---|---|---|---|
| 12.5: | | | | | |
| 1 | TNTC | 64 | 0 | 0 | 0 |
| 2 | TNTC | 3 | 0 | 0 | 0 |
| 6.25: | | | | | |
| 1 | TNTC | 149 | 61 | 0 | 0 |
| 2 | 28 | 11 | 5 | 0 | 0 |
| 3.125: | | | | | |
| 1 | TNTC | TNTC | TNTC | TNTC | TNTC |
| 2 | TNTC | TNTC | TNTC | TNTC | TNTC |

TABLE IV

| Available Chlorine and/or Bromine, p. p. m. | 15 Sec. | 30 Sec. | 60 Sec. | 120 Sec. | 300 Sec. |
|---|---|---|---|---|---|
| 12.5: | | | | | |
| 1 | 1 | 3 | 0 | 0 | 0 |
| 2 | 1 | 0 | 0 | 0 | 0 |
| 6.25: | | | | | |
| 1 | 0 | 0 | 0 | 0 | 0 |
| 2 | 0 | 0 | 0 | 0 | 0 |
| 3.125: | | | | | |
| 1 | TNTC | TNTC | TNTC | 28 | 1 |
| 2 | 18 | 35 | 31 | 5 | 0 |

The following tables show the results of bacteriological studies on various compositions hereof. "TNTC" indicates that less than 99.9% of the organisms were destroyed; where a figure is shown, it indicates over 99.9% destruction of the organism. The data set forth in these tables (i. e., Tables V–X) indicate that solutions of our solid compositions, containing a hypochlorite component and bromide, possess greater germicidal activity than if a molecular equivalent amount of available chlorine alone were present.

In Table V the composition tested contained 63% chlorinated trisodium phosphate (3.5% available chlorine), 18% sodium tripolyphosphate, and 19% sodium metasilicate pentahydrate. The data shown in Table V, as well as Table VI, were obtained using the Weber and Black method (Am. J. Public Health, 38, 1405–1417) with *M. pyogenes* var. *aureus* washed from a 24-hour agar slant and suspended in sterile tap water; the plating medium was tryptone glucose extract agar, the plates being incubated for 24 hours at 37° C. Table V shows the disinfectant properties of said composition after exposure periods of 15 sec., 30 sec., 60 sec., 120 sec., and 300 sec. with various levels of available chlorine.

In acquiring the data set forth in Table VI, the same product employed in obtaining the data shown in Table V, plus 1.32% NaBr·2H$_2$O, was employed. The data in Table VI show the disinfectant properties of said product after exposure periods of 15 sec., 30 sec., 60 sec., 120 sec., and 300 sec. with the same levels of available halogen as set forth in Table V.

TABLE V

| Available Chlorine, p. p. m. | 15 Sec. | 30 Sec. | 60 Sec. | 120 Sec. | 300 Sec. |
|---|---|---|---|---|---|
| 25: | | | | | |
| 1 | TNTC | TNTC | TNTC | 1 | 1 |
| 2 | TNTC | TNTC | 400 (est.) | 0 | 0 |
| 12.5: | | | | | |
| 1 | TNTC | TNTC | TNTC | 325 | 13 |
| 2 | TNTC | TNTC | TNTC | 48 | 2 |
| 6.25: | | | | | |
| 1 | TNTC | TNTC | TNTC | TNTC | 38 |
| 2 | TNTC | TNTC | TNTC | TNTC | 5 |
| 3.125: | | | | | |
| 1 | TNTC | TNTC | TNTC | TNTC | TNTC |
| 2 | TNTC | TNTC | TNTC | TNTC | TNTC |

TABLE VI

| Available Chlorine and/or Bromine, p. p. m. | 15 Sec. | 30 Sec. | 60 Sec. | 120 Sec. | 300 Sec. |
|---|---|---|---|---|---|
| 25: | | | | | |
| 1 | 21 | 6 | 3 | 1 | 0 |
| 2 | 4 | 1 | 0 | 0 | 0 |
| 12.5: | | | | | |
| 1 | 19 | 16 | 4 | 0 | 0 |
| 2 | 2 | 2 | 0 | 0 | 0 |
| 6.25: | | | | | |
| 1 | 54 | 12 | 4 | 0 | 0 |
| 2 | 5 | 3 | 0 | 0 | 0 |
| 3.125: | | | | | |
| 1 | TNTC | 85 | 83 | 17 | 4 |
| 2 | 195 | 12 | 9 | 2 | 1 |

The data set forth in Table VII were obtained using the same product employed in obtaining the data shown in Table V but employing higher levels of available chlorine and obtaining test data after exposure periods of 1 sec., 5 sec., 10 sec., and 20 sec.

The data set forth in Table VIII were obtained using the same product (containing 1.32% NaBr·2H$_2$O) used in acquiring the data shown in Table VI but employing the higher levels of available halogen used in Table VII and using exposure periods of 1 sec., 5 sec., 10 sec., and 20 sec.

In Tables VII and VIII, the organism tested was *M. pyogenes* var. *aureus*, but the tests were made by the glass-slide method of C. K. Johns (AJPH, 37, 10–1947). The plates were made with tryptone glucose extract agar; duplicate plates were made from 200 and 100 p. p. m.

concentration of total available halogen. Tests were conducted at 20° C.

TABLE VII

| Available Chlorine, p. p. m. | 1 Sec. | 5 Sec. | 10 Sec. | 20 Sec. |
|---|---|---|---|---|
| 200: | | | | |
| A | TNTC | TNTC | TNTC | 148 |
| B | TNTC | TNTC | TNTC | 194 |
| 100: | | | | |
| A | TNTC | TNTC | TNTC | TNTC |
| B | TNTC | TNTC | TNTC | 475 |
| 50: A | TNTC | TNTC | TNTC | TNTC |

TABLE VIII

| Available Chlorine and/or Bromine, p. p. m. | 1 Sec. | 5 Sec. | 10 Sec. | 20 Sec. |
|---|---|---|---|---|
| 200: | | | | |
| A | 2 | 1 | 0 | 0 |
| B | 1 | 0 | 1 | 0 |
| 100: | | | | |
| A | 2 | 0 | 5 | 1 |
| B | 4 | 3 | 1 | 1 |
| 50: A | 45 | 4 | 0 | 0 |

The data shown in Table IX were obtained using chlorinated trisodium phosphate. The table shows the effectiveness of this product using various levels of available chlorine and exposure periods of 15 sec., 30 sec., 60 sec., 120 sec., and 300 sec.

Table X shows test data obtained using the same chlorinated trisodium phosphate product, plus 1.32% $NaBr \cdot 2H_2O$, and total amount of available halogen used in obtaining the data shown in Table IX.

In Tables IX and X, 2.5 ml. of a suspension of $M.$ $pyogenes$ var. $aureus$ was added to 2.5 ml. of sterile peptone at a concentration of 1000 p. p. m. in sterile testing jars. The Weber and Black test was then performed in the usual manner.

TABLE IX

| Available Chlorine, p. p. m. | 15 Sec. | 30 Sec. | 60 Sec. | 120 Sec. | 300 Sec. |
|---|---|---|---|---|---|
| 400: | | | | | |
| 1 | TNTC | TNTC | TNTC | 120 | 4 |
| 2 | TNTC | TNTC | TNTC | 31 | 1 |
| 200: | | | | | |
| 1 | TNTC | TNTC | TNTC | TNTC | 1 |
| 2 | TNTC | TNTC | TNTC | TNTC | 0 |
| 100: | | | | | |
| 1 | TNTC | TNTC | TNTC | TNTC | TNTC |
| 2 | TNTC | TNTC | TNTC | TNTC | TNTC |
| 50: | | | | | |
| 1 | TNTC | TNTC | TNTC | TNTC | TNTC |
| 2 | TNTC | TNTC | TNTC | TNTC | TNTC |

TABLE X

| Available Chlorine and/or Bromine, p. p. m. | 15 Sec. | 30 Sec. | 60 Sec. | 120 Sec. | 300 Sec. |
|---|---|---|---|---|---|
| 400: | | | | | |
| 1 | 0 | 0 | 0 | 0 | 0 |
| 2 | 0 | 0 | 0 | 0 | 0 |
| 200: | | | | | |
| 1 | 7 | 1 | 0 | 1 | 0 |
| 2 | 2 | 0 | 0 | 0 | 0 |
| 100: | | | | | |
| 1 | TNTC | TNTC | 13 | 40 | 1 |
| 2 | TNTC | 168 | 4 | 10 | 0 |
| 50: | | | | | |
| 1 | TNTC | TNTC | 168 | 34 | 0 |
| 2 | TNTC | TNTC | 29 | 28 | 0 |

This application is a continuation-in-part of Ellis and Dvorkovitz applications Serial Nos. 438,621 and 438,622, filed June 22, 1954, both now abandoned.

The foregoing detailed description has been given for clearness of understanding only, and no unnecessary limitations should be understood therefrom, as modifications will be obvious to those skilled in the art.

We claim:
1. A stable, solid disinfectant composition comprising: a stable, solid, water-soluble hypochlorite component and a substantially neutral to alkaline, solid, water-soluble metal bromide which do not yield water of hydration to each other, thereby permitting the hypochlorite component to maintain its original degree of hydration in said composition; said hypochlorite component and said bromide being present in said composition in proportions that provide, in solution, at least about 1% by weight available bromine based on the weight of available chlorine; and said composition being sufficiently stable to permit said hypochlorite component to retain at least 50% of its originally available chlorine content when stored in a dry, air-tight container at 80° F. for six months.

2. The composition of claim 1 wherein the bromide is an alkali metal bromide.

3. A stable, solid disinfectant composition comprising: a stable, solid, water-soluble hypochlorite component and a substantially neutral to alkaline, solid, water-soluble metal bromide which do not yield water of hydration to each other, thereby permitting the hypochlorite component to maintain its original degree of hydration in said composition; said hypochlorite component and said bromide being present in said composition in proportions that provide, in solution, more hypochlorite ions than equivalent amount of hypobromite ions; said solid composition providing at least about 0.5% available chlorine based on the weight of said solid composition and at least about 0.078% available bromine based on the weight of said solid composition; and said composition being sufficiently stable to permit said hypochlorite component to retain at least 50% of its originally available chlorine content when stored in a dry, air-tight container at 80° F. for six months.

4. A stable, solid disinfectant composition comprising: a stable, solid, water-soluble hypochlorite component and a substantially neutral to alkaline, solid, water-soluble metal bromide which do not yield water of hydration to each other, thereby permitting the hypochlorite component to maintain its original degree of hydration in said composition; said hypochlorite component and said bromide being present in said composition in proportions that provide at least about 0.5% available chlorine based on the weight of said solid composition and at least about 0.078% available bromine based on the weight of said solid composition; and said composition being sufficiently stable to permit said hypochlorite component to retain at least 50% of its originally available chlorine content when stored in a dry, air-tight container at 80° F. for six months.

5. The composition of claim 4 wherein the hypochlorite component is calcium hypochlorite and the bromide is an alkali metal bromide.

6. The composition of claim 4 wherein the hypochlorite component is a polychloroisocyanuric acid and the bromide is an alkali metal bromide.

7. The composition of claim 4 wherein the hypochlorite component is chloromelamine and the bromide is an alkali metal bromide.

8. The composition of claim 4 wherein the hypochlorite component comprises an aryl monocarbocyclic group having six carbons in the ring with a

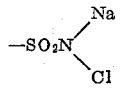

substituent bonded to said ring and water of hydration, and the bromide is an alkali metal bromide.

9. A stable, solid disinfectant composition comprising: chlorinated trisodium phosphate having at least ½% available chlorine and a water-soluble metal bromide which do not yield water of hydration to each other, thereby permitting the chlorinated trisodium phosphate to maintain its original degree of hydration in said composition; said chlorinated trisodium phosphate and said bromide being present in said composition in proportions that provide at least about 0.5% available chlorine based on the weight of said solid composition and at least about 0.078% available bromine based on the weight of said solid composition, respectively, the amount of available bromine, in solution, being at least 1% of the available chlorine; and said composition being sufficiently stable to permit said chlorinated trisodium phosphate to retain at least 50% of its originally available chlorine content when stored in a dry, air-tight container at 80° F. for six months.

References Cited in the file of this patent

UNITED STATES PATENTS

| | | |
|---|---|---|
| 1,555,474 | Mathias | Sept. 29, 1925 |
| 2,250,504 | Salerni | July 29, 1941 |
| 2,380,970 | Kitter | Aug. 7, 1945 |
| 2,393,716 | Smith | Jan. 29, 1946 |
| 2,461,105 | Block et al. | Feb. 8, 1949 |

FOREIGN PATENTS

| | | |
|---|---|---|
| 644 1910 | Great Britain | Sept. 22, 1910 |

OTHER REFERENCES

McCulloch: Disinfection and Sterilization, 2nd ed., 1945, pp. 327–330.